(No Model.)

J. S. STEVENS.
EDGING PLOW.

No. 396,714. Patented Jan. 22, 1889.

Witnesses.
Conrad Henry Marks.
Thomas Simpson

Inventor.
John Sanders Stevens
per Francis M. Rogers
Attorney

UNITED STATES PATENT OFFICE.

JOHN SANDERS STEVENS, OF LONDON, ENGLAND.

EDGING-PLOW.

SPECIFICATION forming part of Letters Patent No. 396,714, dated January 22, 1889.

Application filed July 30, 1888. Serial No. 281,369. (No model.)

*To all whom it may concern:*

Be it known that I, JOHN SANDERS STEVENS, engineer, a subject of the Queen of Great Britain, residing at 48 Leicester Square, in London, England, have invented new and useful Improvements in an Edging-Plow for Gardening Purposes, of which the following is a specification.

My invention consists in an edging-plow for gardening purposes. Its object is to lessen the labor involved in the use of the spade or other tool employed for turning back the mold from the edge of the lawn or other bordering and to render this operation continuous.

The construction and method of using my invention will be readily understood by reference to the drawings, in which—

Figure 7:
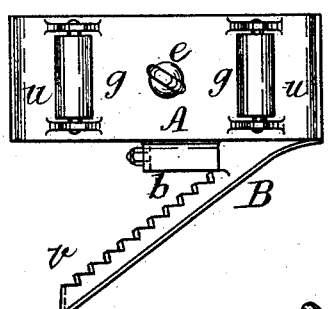
Figure 2:
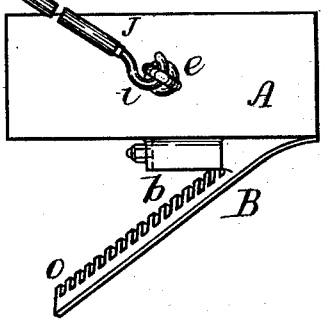
Figure 1:
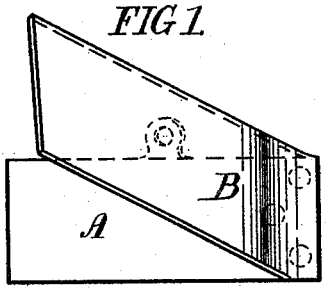
Figure 6:
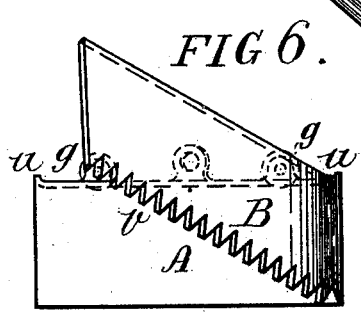
Figure 3:
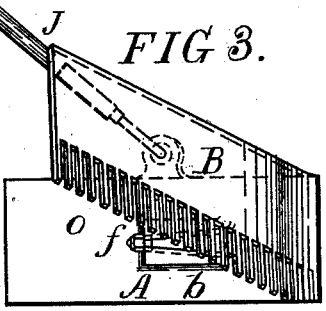
Figure 4:
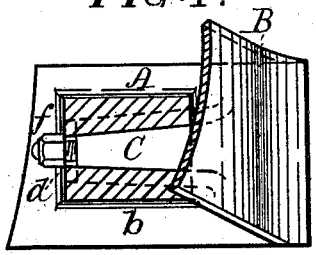
Figure 8:
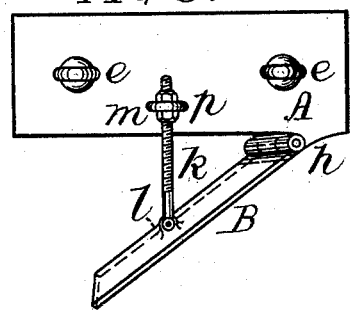
Figure 5:
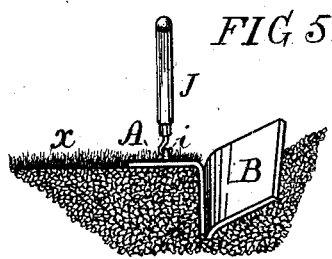
Figure 10:
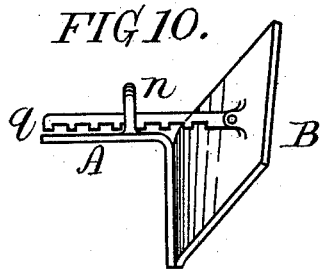
Figure 9:
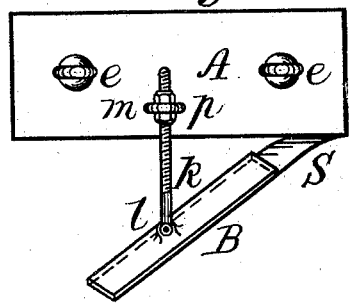

Figure 1 is a side elevation of an edging-plow with turn-furrow cast, welded, or riveted on. Fig. 2 is a plan of the plow with socket. Fig. 3 is an elevation of same; Fig. 4, an enlarged view of the taper socket and tongue; Fig. 5, an end view showing the position of the tool when at work; Fig. 6, an elevation of plow having rollers; Fig. 7, a plan of plow fitted with rollers and cambered ends; Fig. 8, a plan of plow having hinged turn-furrow; Fig. 9, a plan showing turn-furrow mounted on spring; Fig. 10, an end view of plow, showing ratchet adjustment.

Similar letters refer to similar parts in all the views.

A is a piece of wood, metal, or other suitable substance, of sufficient length for my purpose, which I find to be from six to twelve inches, or more. This is so bent as to be of a right-angular shape, Fig. 5, and is adapted for fitting the edge of a lawn or border. At any convenient point thereon I mount one or more eyes, $e$. These can be rigidly fixed, or they can be loosely riveted, so as to swivel in any direction.

To the side of the rectangular piece A, I fix an angular piece or turn-furrow, B, preferably formed of metal similar to A. This can be cast, riveted, or welded on solidly, as shown in Fig. 1; but as I find in practice it is convenient to vary the width of the furrow by inserting a turn-furrow of varying angle I mount the same upon a taper socket, $b$, which can be cast with or riveted on the rectangular piece A. A taper tongue, C, having a screwed pin, $d$, furnished with a nut, $f$, is cast upon or riveted to the turn-furrow B. This tongue is passed into the socket $b$, and can be securely fastened or unfastened, when required, by means of the nut $f$, as shown in Fig. 4. The socket-joint can also be formed vertically, if desired. A wooden handle, J, Figs. 2 and 3, which may be straight or bent, furnished with a hook or equivalent device, $i$, is now passed into the eye $e$ and the plow placed upon the lawn, wood, or tile edging, (as the case may be,) X, as shown in Fig. 5.

By pulling or pushing the handle J, when inserted in the eye $e$, a continuous groove or furrow is formed in the mold, the turn-furrow B pressing back the earth and preserving it in a line parallel to the edging, thus making a clean edge with a uniform depth. I sometimes serrate the lower edge of the turn-furrow, as at V, Figs. 6 and 7, or it may be formed after the manner of a comb, as at O in Figs. 2 and 3, to facilitate the cutting of stiff soil.

Further modifications of my invention consist in rounding or cambering the edges of the rectangular piece A, as at $u$, Figs. 6 and 7, and in inserting two or more rollers, $g$ $g$. The rollers facilitate the traverse of the plow upon the lawn, tile, or other edging. I sometimes mount the angular piece or turn-furrow B upon a hinge-joint, $h$, cast or formed in the substance of the rectangular piece A, as in Fig. 8. A set-screw, K, is pivoted at $l$ and fastened by lock-nuts $p$ to lug $m$; or I vary this arrangement by mounting the piece B on a plain spring, S. (See Fig. 9.) Any desired adjustment can be given the turn-furrow B by means of the set-screw K and lock-nuts, or the set-screw may be replaced by a rack device, $q$, passing through a staple, $n$, mounted upon A, as shown in Fig. 10, and producing a similar result.

The tool can be made of circular or other shape for passing round corners, oval or other beds.

Having fully described my invention, what I desire to claim and secure by Letters Patent is—

1. An edging-plow for gardening purposes, consisting of a plate bent at a right angle for fitting upon the edge of border, having a turn-furrow attached thereto, said plow operating by means of a handle fitted with a hook, for the purposes described.

2. The combination of the edging-plow, having the socket $b$, with the turn-furrow having the tongue C, screwed pin $d$, and nut $f$, for purpose of fastening the parts A B, and the eye $e$, mounted thereon, for operating the plow by means of handle J, as described.

3. The right-angle plate A, having cambered ends $u$ and rollers $g$ $g$ mounted thereon, for the purposes set forth.

In testimony whereof I have hereunto set my hand in presence of two witnesses.

JOHN SANDERS STEVENS.

Witnesses:
 H. W. W. GRAIN,
 I. BRECKELS,
*Clerks to Messrs. Grain & Sons, Notaries, 46 Lombard St., London, E. C.*